Patented Oct. 27, 1936

2,058,597

UNITED STATES PATENT OFFICE 2,058,597

COMPOSITION OF MATTER AND METHOD OF MAKING THE SAME

Walter J. Koenig, Philadelphia, Pa., assignor to Sloane-Blabon Corporation, Philadelphia, Pa., a corporation of Delaware No Drawing. Application December 22, 1934, Serial No. 758,859

16 Claims. (Cl. 260—2)

This invention relates to oleaginous compositions suitable for coatings, plastics, etc., to resinous products resulting therefrom, and to the method of making the same. More particularly, the invention relates to oleaginous coating and plastic compositions adapted to form resinous products by a chemical condensation, to the resulting resinous products.

Prior to my present application, I had discovered and disclosed in my prior application Serial No. 646,148 filed September 7, 1932, of which this application is a continuation in part, that drying oils (in which I include treated and untreated drying oils, treated semi-drying oils and non-drying oils, that possess double bonds in conjugate arrangement, e. g., —C=C—C=C— or —C=C—C=C—C=C—, such as China-wood oil, fish oils, oiticica oil, blown or properly oxidized linseed oil, blown or properly oxidized soya bean oil, blown or properly oxidized poppyseed oil, etc., castor oil heated under reduced pressures to form conjugate double bond structure and esterified, blown or properly oxidized drying oil fatty acids, and the above treated and untreated oils, having the above double bond conjugate structure, blown with drying oil fatty acids or such oils to which blown or properly oxidized fatty acids have been added), can be dried more rapidly even without the use of driers, and with formation of resins which constitute superior products, if these oils are mixed with certain organic compounds and subjected to conditions adapted to promote a desired condensation reaction.

I prefer to use blown or properly oxidized oils, although the raw oils having the above described conjugate double bond arrangement will dry in accordance with my invention.

I have now found that particularly good results may be attained by the use of heterocyclic compounds, having reactive linkages which adapt them to the formation of resins, e. g., by condensation or polymerization, and that oxygen contained in the ring structure of such heterocyclic compounds apparently favors the desired resin-forming reactions.

The invention is applicable to numerous products in which drying oils or resin solutions, cellulosic solutions, etc., have been used before, and including particularly paints, varnishes, printing inks, coatings for tin cans, coating, impregnating, and insulating compositions, and plastics both for sheeted goods, including linoleum, tiles, etc., and molded goods including household utensils, decorative objects, implement handles, etc. Resins made according to my present invention are possessed of properties particularly fitting them for such uses, and, furthermore, may be made cheaply and conveniently from the liquid drying oils, which may be more quickly and satisfactorily converted into resins according to the present invention than they could be dried by oxidation and polymerization (including either process substantially alone) according to the prior art.

The heterocyclic compounds which I have found most suitable for use in the present invention are those which contain only carbon and oxygen in the oxy ring, and especially those having only oxygen or oxygen containing groups attached to the heterocyclic nucleus. By oxy-heterocyclic compounds I mean true saturated or true unsaturated cyclic or closed chain compounds, which contain only carbon, hydrogen and oxygen in the closed chain structure, and also those compounds having oxygen or oxygen-containing groups attached to the oxy-heterocyclic closed chain structure.

These include particularly the closed ring anhydrides, the lactones, and especially oxy-heterocyclic compounds of the six-membered ring structure, coumarone and furane type. Because of their relatively low cost and adequate commercial supply, I prefer phthalic and maleic anhydrides; also, coumarone and furane and their derivatives among which may be mentioned especially coumarin, coumaranone, furfural, furfuryl alcohol, tetrahydro-furfuryl alcohol. Coumarone itself and furane have been used, but the superior results with the compounds mentioned adequately justify their use in preference to the simple ring compounds.

Other compounds which are chemically within this group, but for commercial reasons are less important at the present time, include γ-pyrone, chomone, glutaric anhydride, α-α dimethyl-γ-pyrone, γ-butyrolactone.

I have found, furthermore, that the closed ring anhydrides as a class and especially phthalic and maleic anhydrides are especially desirable, presumably because they combine through the double oxygens attached to the oxy-heterocyclic ring.

Compounds like pyrone and coumalic acid which include the characteristic structure

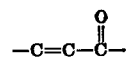

are also particularly desirable and are broadly claimed, together with other compounds of that structure, in my application Serial No. 758,863 filed herewith.

All of these last mentioned compounds have O- atoms double bonded onto the heterocyclic nucleus which my experience has shown to be a particularly desirable reactive linkage. Apparently, condensation with the oil may be by a breaking of one of the C=O bonds and a combining thereby with one of the double bonded C- atoms of the oil. In the polybasic acid anhydrides the two O- atoms apparently react with two double bonded C- atoms, probably at the conjugate double bond of the oil thus forming a new ring in which the oil molecule is a part and which is condensed with the ring of the anhydride.

While I have named above a few of the compounds which are suitable for use according to this invention, this list could be expanded indefinitely. Numerous compounds of the type specified had already been known to form resins by condensation, polymerization, etc., and many more are being discovered and developed constantly. So far as I have been able to determine, all of these resin-forming oxy-heterocyclic compounds may be condensed with the oils to form resinous reaction products according to the present invention.

The exact chemical nature of the reactions involved in the practice of the present invention is not as yet fully determined. It seems clear, however, that some degree of condensation takes place.

I have used the term "condensation" herein broadly to mean the union of two or more organic substances with or without the elimination of component elements.

It has been demonstrated that the desired reaction proceeds with little or no oxygen present and more rapidly even at relatively low temperatures, e. g., 130° F., than can be accounted for by polymerization. In view of the fast drying action with little or no oxygen present, it is apparent that driers are not required, and although they can be used, I prefer to omit them. The presence of driers in such mixtures, which have excess uncondensed oil present, will cause continued oxidation of such uncondensed oils and thereby cause brittleness in the dried film. The dried products obtained through the present process have properties altogether different and superior to those of oxidized and/or polymerized oils.

I have found that some oxidation is desirable. Initial oxidation, either of the oil before the addition of the condensing agent or during the heating of the oil and condensing agent at the start of the reaction, seems to set off and stimulate the condensation. My investigations, furthermore, have convinced me that the desirable properties of these oleaginous condensaion products are due primarily to the greater complexity of the condensed molecule as compared with the molecule produced by simple oxidation and/or polymerization. The blended vehicle may be dried to a superior resinous product by condensation substantially without oxidation.

Apparently the condensation occurs at the double bond structures and a preliminary oxidation seems to render these more active. It has also been observed that conjugate double bond structures such as occur in the fatty acids of China-wood oil are more active in this reaction than those such as linolic and linolenic, in which methylene groupings are interposed.

I have found that the oils which are slightly oxidized are better than the raw oils or the intermediate oxidized oils. A slight oxidation (e. g., as in a 7″ Gardner-Holt-blown oil) seems to render the oil more reactive, and this seems to be the point at which peroxide structures are formed at one of the three double bonds of each elaeostearic acid radical. More highly oxidized oils are very reactive with the condensing reagent. Thus with a very heavy blown oil, phthalic anhydride reacts violently and the mass may go solid within 10 minutes or 15 minutes.

Mixtures of oils may be used and more particularly mixtures of condensing agents, as more fully described and claimed in my application Serial No. 758,864 filed herewith.

If more than one condensing agent is used, it is not necessary to add the several condensing agents as a mixture at the start of the reaction. The reaction may be started with a single condensing agent, and after the reaction has progressed to any point before becoming a solid mass, the reaction may be retarded by merely cooling the mixture. Additional condensing agent may then be added, if desired, and the reaction accelerated again by merely raising the temperature. The addition of more than one condensing agent tends to create final products having more complex structures, thereby creating a tougher film in the final product. It is understood that the reaction may be retarded and accelerated any number of times before completion and, if desired, additional condensing agents may be added which enter the condensation reaction. If desired, an additional quantity of the original condensing agent or a mixture of the original and a different type of condensing agent may be added. It is within the scope of this invention to include the addition of an additional quantity of the same condensing agent used at the start of the reaction and/or a different one at any point in the reaction. The feature of accelerating and retarding the reaction at any desired point in the reaction is a very desirable point, and is accomplished by merely controlling the temperature. It is not necessary to add additional condensing agents to again accelerate the reaction after it has been retarded, although this may be done if so desired, as explained above.

As an example of one way in which the invention may be carried out in practice, a vehicle is made up of

| | Parts by weight |
|---|---|
| Blown China-wood oil (no driers) 7″ viscosity (Gardner-Holt tube) at 86° F | 70 |
| 25 gal. phenol-formaldehyde resin China-wood oil varnish (no driers) 35% volatile | 30 |
| Coumarone | 25 |

The components of the vehicle may be either refluxed together at the boiling point of the mixture, or blown to the desired viscosity, after which pigments may be added, for example:

| | Parts by weight |
|---|---|
| Zinc | 20 |
| Lithopone | 100 |
| Barytes | 100 |

The vehicle and pigments are mixed and ground in the usual way, e. g., through a roller mill. The resulting paint is suitable for block printing of floor coverings or other enamel coatings, and may be quickly dried to a tough, non-tacky, resinous coating, e. g., by heating to 140° F., or higher. This drying may be carried out in heated rooms with substantially no circulation of air over the surface of the goods, so that oxidation of the oil during the drying may be minimized. Recirculation of the gases given off by the vehicle over the surface of the goods gives excellent results and is done so in practice.

The dried coating is, and remains even after long storage or use, tough, flexible and extremely resistant to abrasion and chemical attack.

It is to be understood that the proportions and the particular ingredients specified in the above examples are given only to illustrate the invention and the manner of practicing it by certain specific examples and that these proportions and ingredients can be varied within relatively wide limits without departing from the scope of my invention. For example, it will be readily understood that the proportions of thinner will depend primarily upon the consistency desired and this may be varied, as will be apparent to anyone skilled in the art. The particular thinner chosen for this purpose is also a matter of relatively free choice. The thinner preferably should be one which is inert or one which condenses with the oil or the oil condensation product.

Various resins, both reactive and unreactive, may be used in the composition as will be obvious to those skilled in the art of manufacturing paints and varnishes and plastics, etc.

As already stated, the proportions of the condensing reagents may be substantially varied. If it is desired to obtain the more flexible and tougher films characteristic of those formed by bonding molecules of the oils together with a condensing reagent capable of reacting at two parts of the same molecule with different molecules of the oil, it is important that the proportions of the condensing reagent should be limited. Except for this, a reasonable excess of the condensing reagent is not objectionable and will ordinarily be driven off as vapor during the heating or drying of the composition.

The coumarone in the formula given above serves as a thinner as well as a resin-forming ingredient. An excess amount of this material is used because of the evaporation which occurs during blowing and/or drying. I have found that it is particularly desirable to use a volatile resin-forming agent in this way, since the slow evaporation of the volatile material covers the surface like a blanket and protects the drying oil from objectionable oxidation, thereby allowing the drying to proceed as described and claimed in my application Serial No. 7,717, Series 1935 filed herewith. The desired partial oxidation can be performed almost entirely by blowing under controlled conditions. It is not essential, however, that the resin-forming agent be volatile, and it is entirely possible to separate these functions, e. g., using an inert slowly volatile solvent and a non-volatile resin-forming condensing agent.

Furfural or a coumarone-indene fraction from coal tar can be substituted in whole or in part for the coumarone, using substantially the same weight as is omitted from the coumarone of the formula. Similarly, the phenol-formaldehyde resin may be replaced, pound for pound, by polymerized para-coumarone indene or coumarone resin. Where such resin is used, however, I prefer that it be different from the condensing reagent. Thus, with coumarone resin I use a reagent other than coumarone as the resin-forming reagent, e. g., tetrahydro-furfuryl alcohol. A very satisfactory vehicle may be made with coumarone resin and tetrahydro-furfuryl alcohol by refluxing the mixture at the boiling point.

Where light colors, or clear transparent films are desired, cumar resin (polymerized p-coumarone) is superior to polymerized furfural, because it does not cause any appreciable discoloration, whereas furfural resin does result in some yellowing of the film. Tetrahydro-furfuryl alcohol may be used in place of furfural, if so desired.

The curing of paint films, such as those disclosed above, may take place at temperatures as low as 110° and 140° F. With less readily reactive condensing reagents, higher temperatures may be practically required throughout the drying. In general, the rate of drying increases with increase in temperature, but certain disadvantages begin to appear if the temperature is increased above 140° F. during the final drying of surface films. Thus, at high temperatures, discoloration is likely to occur and excessive vaporization of the condensing reagent may drive it off from the oil before the desired condensation can occur, thus wasting the condensing reagent, the gases of which serve as a protective blanket during drying, and unnecessarily increasing the cost. However, the increase in temperature, if used, may readily be offset by the substitution of a condensing agent having a very low vapor pressure to reduce the excessive vaporization. In any case, I have found it desirable not to exceed temperatures of about 450° to 400° F.

Coumarone-indene fraction from coal tar distillation ordinarily contains a relatively high proportion of indene. Coumarone and coumarone-indene can be used in conjunction with blown China-wood oil to produce an excellent printing ink vehicle, providing it is done at super-atmospheric conditions. A similar composition, containing B-naphthol, can also be used. B-naphthol, normally considered an inhibitor in drying of films by oxidation, in this reaction tends to hasten the drying of the oil film through condensation. B-naphthol acts as a condensing agent, as disclosed in my original application, Serial No. 646,148.

I have already referred to the use of phthalic and maleic anhydrides as especially advantageous embodiments of my invention. As one example of this, I may obtain excellent products with about 5 per cent of maleic or phthalic anhydride based on the weight of the oil hot blended preferably with a blown oil, either a light bodied oil or a very heavy bodied oil and heated or blown, e. g., at about 200° F., an excellent vehicle or plastic may be thus obtained depending upon the extent to which the reaction is carried before the mixture is cooled.

A similar composition containing para-coumarone indene resin, e. g., in amount equal to 10 to 20 per cent of weight of the oil forms, if carried far enough, an excellent cement for plastics. The reaction in this combination proceeds so rapidly that great care must be taken in terminating the reaction by cooling when the desired body has been reached. For example, with a mixture of 20% heavy blown China-wood oil, 80% heavy blown linseed oil, and 10 to 20 per cent para-coumarone indene resin melted in a Walton kettle and heated until foaming stops, if phthalic anhydride is added to the mixture, it will set up in 10 minutes to an excellent cement. Without the phthalic anhydride approximately 1½ hours would be required to produce a cement at all equivalent.

I have found that an amount of maleic and phthalic anhydrides equal to about 4 to 5 per cent of the weight of the oil produces the best results, and that this amount is actually combined with the oil. Increased amounts of maleic and phthalic anhydrides can be added to the oil, but seemingly do not improve the quality of the resulting product, and a lesser amount will not realize the full possibilities of my invention.

It will already have been appreciated by those skilled in the art that a feature of primary importance of the present invention is that the reactions herein disclosed are capable of drying the oils in films without objectionable distortion, whether the oil is extended upon a surface of large area or as an adhesive film on particles of a plastic composition. It constitutes, therefore, not only a method of obtaining novel resinous compositions, but even more important, a method of drying oils by converting them into such resinous products directly, and after they have been given their form as finally desired.

It is of primary importance, moreover, that according to the present invention the reaction can be initiated en masse and then interrupted at a point short of complete drying to obtain proper viscosities for desired working properties of paints and cements. Thus the more costly final step of curing the finished article can be reduced to a very short treatment.

It seems clear that a condensation occurs. The extent of condensation depends on the condensing agents used, but regardless whether the condensation is partial or practically complete, the reaction falls within the scope of this invention, since my invention embraces rapid drying action at super-atmospheric temperatures in substantially non-oxidizing atmospheres as due to the condensation. In the case of partial condensation, i. e., where the amount of condensing agent is less than in stoichometric relations, it is my theory that the presence of the particular type of condensation product of the oil and condensing agents is responsible for the rapid drying. The invention described herein cannot be construed in the same light as the action of driers, as the action proceeds unimpeded or rapidly, as the case may be, in substantially non-oxidizing atmospheres at super-atmospheric temperatures with definite favorable results starting as low as 120° F., which, in addition, differentiates from polymerization and oxidation under similar conditions.

In the above, I have endeavored to explain the invention and the principle thereof in such terms that others skilled in the art may not only duplicate my own results in the preferred examples, but may, with application of ordinary skill, by following the lines indicated herein, apply the invention in other compositions and under other special conditions and demands. In order to make clearer this explanation, I have set forth certain theories which will be helpful in thus applying and extending the invention, but which I am well aware have not been fully proven and may prove to be not entirely accurate. My invention is not dependent upon the validity of such theories, and this application is not to be limited thereby.

What I claim is:

1. The method of hardening drying oil which comprises condensing a mixture in which the condensation reactants consist of oxidized drying oil having double bonds in conjugate arrangement and an oxy-heterocyclic compound at super-atmospheric temperature.

2. The method of hardening drying oil which comprises condensing a mixture in which the condensation reactants consist of oxidized drying oil having double bonds in conjugate arrangement and oxy-heterocyclic compounds at super-atmospheric temperature.

3. The method as described in claim 1, in which the oxyheterocyclic compound includes a reactive oxygen not in the nucleus.

4. The method as described in claim 1, in which the oxyheterocyclic compound includes oxygen double-bonded to C atoms of the nucleus.

5. The method as described in claim 1, in which the oxyheterocyclic compound is coumarone.

6. The method as described in claim 1, in which the oxyheterocyclic compound is furfural.

7. The method as described in claim 1, in which the oxyheterocyclic compound is phthalic anhydride.

8. The method as described in claim 1, in which a synthetic resin is present during the condensation reaction.

9. In the treatment of oxidized oils having double bonds in conjugate arrangement for conversion thereof into hardened products, the process which comprises condensing a mixture at super-atmospheric temperature in which the condensation reactants consist of the oil and an oxyheterocyclic compound having a reactive linkage adapted to combine with a reactive linkage of the oil, cooling the condensed mixture, thereby retarding the condensation reaction, shaping the mixture into a desired useful product, and finally hardening the product by heating at super-atmospheric temperature.

10. The treatment of oxidized oils as described in claim 9, in which the final hardening occurs in an atmosphere substantially devoid of oxygen.

11. In the treatment of oxidized oils having double bonds in conjugate arrangement for conversion thereof into hardened products, the process which comprises condensing a mixture at super-atmospheric temperature in which the condensation reactants consist of the oil and oxyheterocyclic compounds having reactive linkages adapted to combine with reactive linkages of the oil, cooling the condensed mixture thereby retarding the condensation reaction, shaping the mixture into a desired useful product, and finally hardening the product by heating at super-atmospheric temperature.

12. The treatment of oxidized oils as described in claim 11, in which the final hardening occurs in an atmosphere substantially devoid of oxygen.

13. A composition of matter which comprises a condensed mixture in which the condensation reactants consist of oxidized drying oil having double bonds in conjugate arrangement and an oxy-heterocyclic organic compound having a reactive linkage capable of bonding to the oil.

14. A composition of matter which comprises a condensed mixture in which the condensation reactants consist of oxidized drying oil having double bonds in conjugate arrangement and oxyheterocyclic compounds having reactive linkages capable of bonding to the oil.

15. A tough and hardened drying oil product characterized by its alkali-resistance and flexibility, which comprises a condensed mixture in which the condensation reactants consist of oxidized drying oil having double bonds in conjugate arrangement and an oxy-heterocyclic compound.

16. A tough and hardened drying oil product characterized by its alkali-resistance and flexibility, which comprises a condensed mixture in which the condensation reactants consist of oxidized drying oil having double bonds in conjugate arrangement and oxy-heterocyclic compounds.

WALTER J. KOENIG.